No. 808,935. PATENTED JAN. 2, 1906.
T. G. LEWIS.
HANDLE FOR DENTAL FLASKS.
APPLICATION FILED AUG. 26, 1905.
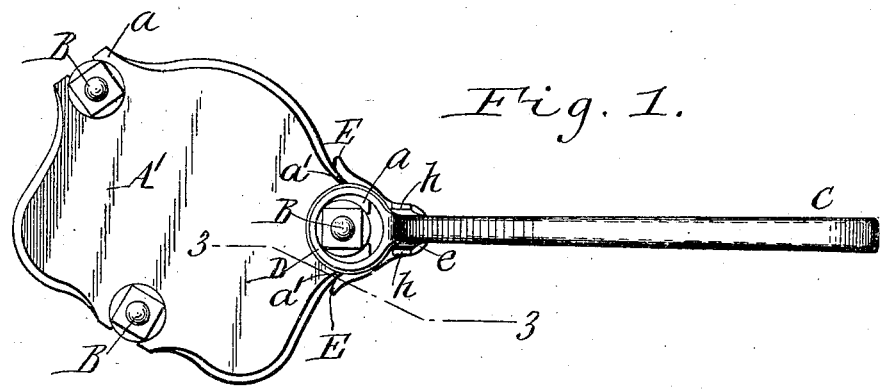
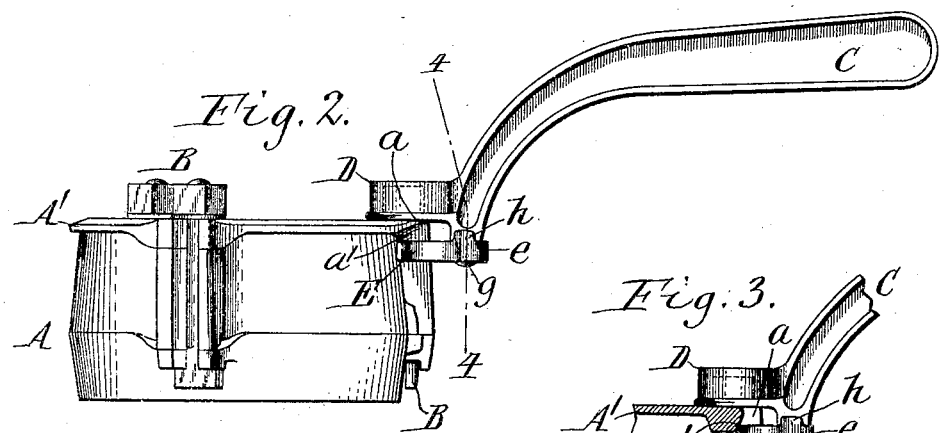
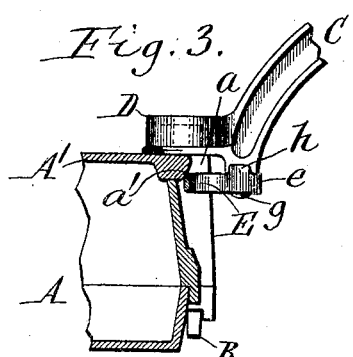
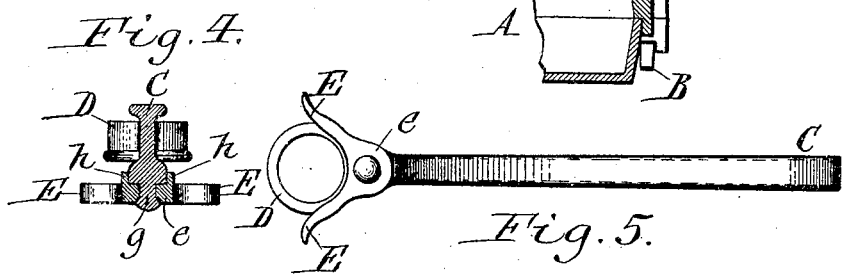

UNITED STATES PATENT OFFICE.

THEODORE G. LEWIS, OF BUFFALO, NEW YORK, ASSIGNOR TO BUFFALO DENTAL MANUFACTURING COMPANY, OF BUFFALO, NEW YORK, A CORPORATION OF NEW YORK.

HANDLE FOR DENTAL FLASKS.

No. 808,935.      Specification of Letters Patent.      Patented Jan. 2, 1906.

Application filed August 26, 1905. Serial No. 275,870.

*To all whom it may concern:*

Be it known that I, THEODORE G. LEWIS, a citizen of the United States, residing at Buffalo, in the county of Erie and State of New York, have invented a new and useful Improvement in Handles for Dental Flasks, of which the following is a specification.

The object of my invention is the provision of a convenient handle for dental flasks which can be readily applied to and removed from the flask.

In the accompanying drawings, Figure 1 is a top plan view of the handle attached to a flask. Fig. 2 is a side elevation thereof applied to the flask. Fig. 3 is a fragmentary vertical section in line 3 3, Fig. 1. Fig. 4 is a transverse section of the handle in line 4 4, Fig. 2. Fig. 5 is a bottom plan view of the detached handle.

Similar letters of reference indicate corresponding parts throughout the several views.

A indicates the body of an ordinary dental flask, A' its cover or top plate, and B the usual bolts for clamping the parts together. The cover has the customary notched lugs $a$, which receive the front bolts.

C is the body of the handle, which is substantially horizontal and curved downward at its front end. On the front side of this curved portion, near its lower end, the handle is provided with a horizontal eye or loop D of the proper size to fit freely over the nut or upper end of one of the clamping-bolts B, preferably one of the front bolts, as shown. Below this eye the handle is provided with two forwardly-projecting arms or horns E E, adapted to engage under the usual beveled or overhanging portions $a'$ of the cover A' at opposite sides of the adjacent clamping-bolt, as shown in Fig. 3. These horns diverge forwardly to fit the outwardly-converging sides of the notched lugs $a$ of the cover, as shown in Fig. 1. The eye D is integral with the handle, and the horns E may also be cast in one piece therewith; but they are preferably made separate from the handle to facilitate the manufacture of the device. For this purpose the handle is provided at its lower end with a depending pin or stud $g$ and the horns are formed in one piece with a perforated hub $e$, which is secured upon said stud by upsetting the lower end of the latter, whereby the hub is confined between the head of the stud and the shoulder formed by the lower end of the handle, as shown in Fig. 4. The horns are prevented from turning on the stud by upwardly-projecting lips $h$, formed on the hub $e$ and bearing against opposite sides of the handle, as best shown in Figs. 1 and 4.

In attaching the handle to a dental flask its eye D is passed over the nut of one of the front clamping-bolts by tilting the handle forwardly, and the handle is then swung down to allow the eye to rest squarely upon the flask and cause the horns E to engage under the beveled or overhanging edge of the cover, as hereinbefore described. Upon lifting the flask by means of the handle the overhanging weight of the flask causes the nut encircled by the eye D to bear against the front side of the latter, while the horns prevent the eye from slipping off the nut, thus holding the handle in reliable engagement with the flask. The horns by bearing against the flask on opposite sides of the adjacent clamping-bolt prevent the flask from swinging laterally on the handle. The handle is readily detached by tilting it upward and forward sufficiently to allow its horns to clear the beveled edge of the cover.

I claim as my invention—

1. A handle for a dental flask, comprising a body provided with means constructed to embrace the projecting upper end of a clamping-bolt of the flask and below said means with a member adapted to engage the side of the flask, substantially as set forth.

2. A handle for a dental flask provided with an eye or loop adapted to fit over one of the clamping-bolts of the flask and below the eye with arms or horns adapted to engage the side of the flask, substantially as set forth.

3. A handle for a dental flask, comprising a substantially horizontal body having a downwardly-curved front end, an eye or loop projecting forwardly from the curved portion of the handle and adapted to fit over one of the clamping-bolts of the flask, and a pair of horns projecting forwardly from said curved portion below the eye or loop and adapted to engage the side of the flask, substantially as set forth.

4. A handle for a dental flask, comprising a substantially horizontal body having a downwardly-curved front end, an eye or loop projecting forwardly from the curved portion of the handle and adapted to fit over one of the clamping-bolts of the flask, and a pair of diverging horns extending forwardly from said curved portion below the eye or loop and adapted to engage the side of the flask, substantially as set forth.

5. A handle for a dental flask, comprising a body having a downwardly-curved front portion provided at its end with a headed stud, a hub applied to said stud and carrying a pair of forwardly-extending horns, and an eye or loop projecting forwardly from the handle above said horns, substantially as set forth.

6. A handle for a dental flask, comprising a body having a downwardly-curved front portion provided at its end with a headed stud, a hub applied to said stud and provided with a pair of forwardly-extending horns and upwardly-projecting lips bearing against opposite sides of the handle, and an eye or loop projecting forwardly from the handle above said horns, substantially as set forth.

Witness my hand this 24th day of August, 1905.

THEODORE G. LEWIS.

Witnesses:
 THEO. L. POPP,
 E. M. GRAHAM.